United States Patent [19]

Suzuki et al.

[11] Patent Number: 4,702,008

[45] Date of Patent: Oct. 27, 1987

[54] ZERO SETTING DEVICE IN SURVEYING INSTRUMENT

[75] Inventors: Shinichi Suzuki; Masato Hara; Koji Tsuda; Eiji Takasugi; Toshifumi Kinba; Atsumi Kaneko, all of Tokyo, Japan

[73] Assignee: Asahi Kogaku Kogyo Kabushiki Kaisha, Tokyo, Japan

[21] Appl. No.: 900,477

[22] Filed: Aug. 26, 1986

[30] Foreign Application Priority Data

Sep. 6, 1985 [JP] Japan .................................. 60-196995

[51] Int. Cl.$^4$ ................................................ G01C 1/00
[52] U.S. Cl. ...................................... 33/1 T; 33/1 PT
[58] Field of Search ................. 33/1 T, 299, 290, 292, 33/1 PT, 267

[56] References Cited

U.S. PATENT DOCUMENTS 4,072,893  2/1978  Huwyler .......................... 33/1 PT
4,466,189  8/1984  Tobin, Jr. ........................... 33/1 T Primary Examiner—Willis Little
Attorney, Agent, or Firm—Sughrue, Mion, Zinn, Macpeak, and Seas

[57] ABSTRACT

A surveying instrument for measuring a rotation angle in which a rotation angle is measured from a reference direction and is displayed. The reference angle is set by zeroing the displayed angle. The display is zeroed only if a reset button is operated twice within a fixed period.

6 Claims, 3 Drawing Figures

ZERO SETTING DEVICE IN SURVEYING INSTRUMENT

BACKGROUND OF THE INVENTION

1. Field of the Invention

This invention relates to a surveying instrument for measuring angles. More particularly, the invention relates to a zero setting device in a surveying instrument.

2. Background Art

In general, in a surveying instrument for measuring angles, a rotary stand with a collimator is rotatably supported on a base stand so that the angle between sightings of targets, as collimated through the collimator, is measured from the rotation angle of the rotary stand with respect to the base stand. That is, the angle is set to zero which is indicated by an angle displaying unit when the collimator is set in a predetermined direction (or a reference direction). Under this condition, the angle which is then indicated when a subsequent sighting of target is collimated through the collimator is read from the angle displaying unit. The angular indication is provided by electrically measuring the rotation angle of the rotary stand and is digitally displayed on the angle displaying unit.

Accordingly, it is essential for the surveying instrument described above to have a zero setting means which, when the collimator is set in a reference direction, zeroes the value displayed on the angle displaying unit. In a conventional surveying instrument, a zero setting switch is employed as the zero setting means. That is, the angle value displayed on the angle displaying unit is set to zero by manually operating the zero setting switch once. It is true that the zero setting switch is advantageous in that it can be readily operated. However, it is still disadvantageous in that sometimes the zero setting switch is carelessly operated by the operator, as a result of which the measurement must be carried out all over again.

In order to eliminate this difficulty, in the past, the zero setting switch has been installed at a position where it cannot be carelessly operated, such as in a recess, or the zero setting switch is provided with a cover so that it cannot be operated without opening the cover. However, such positioning makes the operation of the zero setting switch mechanically difficult and worsens the operability of the surveying instrument.

SUMMARY OF THE INVENTION

Accordingly, an object of this invention is to provide a zero setting device for a surveying instrument for measuring angles in which the above-described difficulties have been eliminated.

More particularly, an object of the present invention is to provide a zero setting device for which, even if the zero manually-operated setting switch is located at a convenient position where it can be manually operated with ease, the zero setting switch is never erroneously manually operated.

This invention has been accomplished using the concept that the data displayed on the angle displaying unit is set to zero only when the zero setting switch is operated twice within a predetermined period. The zero setting device according to the invention comprises the zero setting switch, a timer which starts when the zero setting switch is operated once and a zero setting means which, when the zero setting switch is operated again during the operation of the timer, zeroes the angle displayed on the angle displaying unit. The operation time of the timer, i.e., the zero setting enabling time can be indicated by a timer operation indicating unit such as a buzzer or a lamp.

DETAILED DESCRIPTION OF THE PREFERRED EMBODIMENTS

Figure 3:
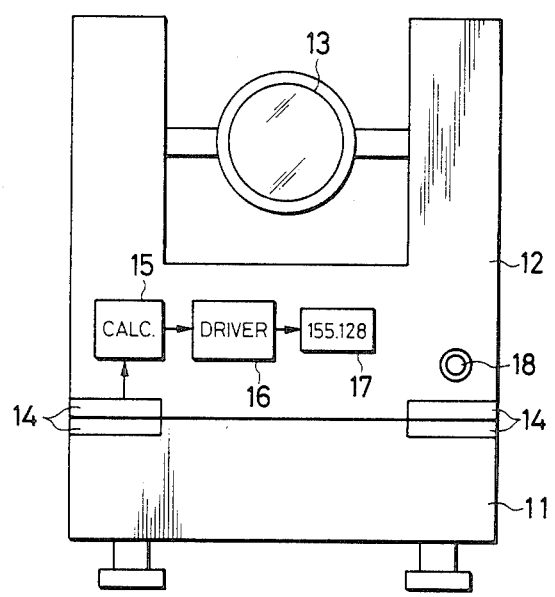
FIG. 3 is a front view of the surveying instrument, showing its essential components.

This invention will be described with reference to its preferred embodiment. FIG. 3 shows one example of a surveying instrument. In the surveying instrument, a rotary stand 12 is rotatably supported on a base stand 11, and a collimator (collimating telescope) 13 is fixedly installed on the rotary stand 12. A pulse generator 14 is interposed between the base stand 11 and the rotary stand 12. The pulse generator 14 produces one pulse every rotation angle of the rotary stand 12 with respect to the base stand 11 and thus functions as an angular pulse encoder. The pulses produced by the pulse generator 14 are applied to a rotation angle calculating means 15 where it is converted into an angle, which is applied through an angle displaying unit driving means 16 so as to be displayed on an angle displaying unit 17. An angle detecting mechanism of this type using electrical pulse signals is well known as an optical rotary encoder. Further in FIG. 3, a zero setting switch 18 is provided at the position where the switch 18 can be readily manually operated.

Figure 1:
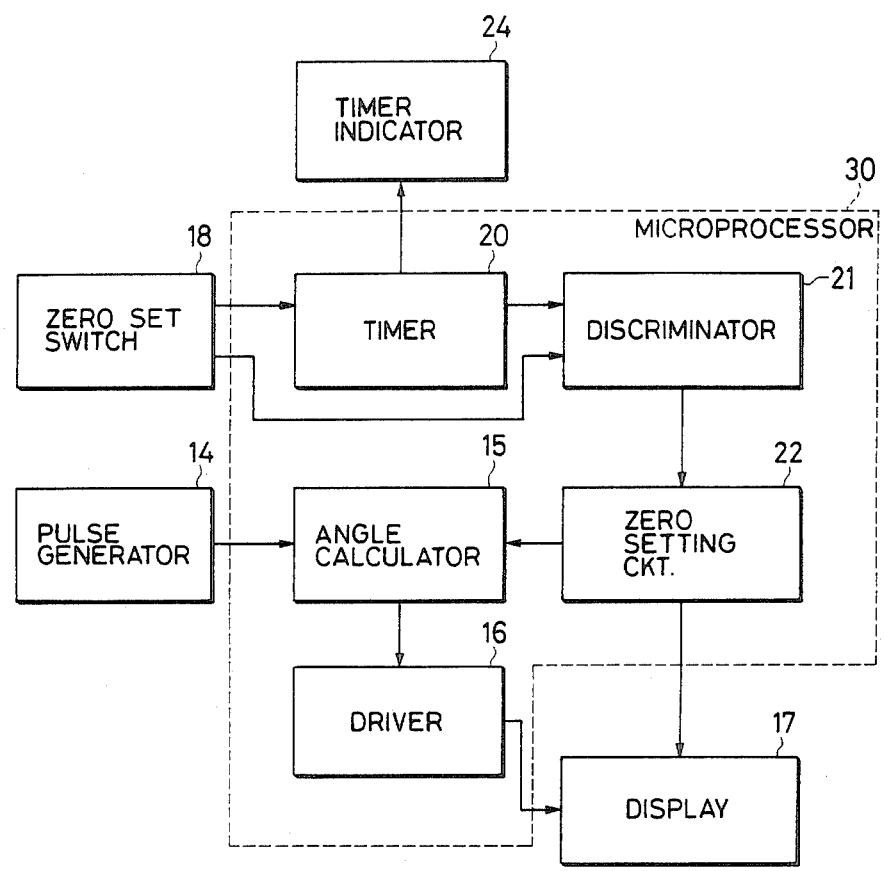
FIG. 1 is a block diagram showing one example of a zero setting device in a surveying instrument according to this invention.

In the invention, a timer is operated by the zero setting switch 18 so that the timer operates for a zero setting enabling time. When the zero setting switch 18 is manually operated again within the zero setting enabling time, the angle displaying is zero-set. For this purpose, as shown in FIG. 1, the zero setting switch 18 is connected to a timer 20, and the timer 20 and the zero setting switch 18 are both connected to a second input discriminating means 21. The second input discriminating means 21 can be made up of an AND circuit for instance. When the zero setting switch 18 is operated during the operation of the timer 20, the second input discriminating means 21 zeroes the display on the angle displaying unit 17 through a zero setting means 22 and resets (zeroes) the content of the counter in the rotation angle calculating means 15. The zero setting switch 18 is connected through the timer 20 to a timer operation indicating unit 24 which indicates the fact that the zero setting switch 18 has been operated. The timer operation indicating unit 24 may be a buzzer producing a sound, or a lamp using an LED emitting light for the indication. In addition, a written indication, such as for instance "ZERO SET?", may be employed for the angle displaying unit 17 or other displaying sections.

The above-described rotating angle calculating means 15, displaying unit driving means 16, timer 20, second input discriminating means 21 and zero setting means 22 may be replaced by a suitable microprocessor 30.

Figure 2:
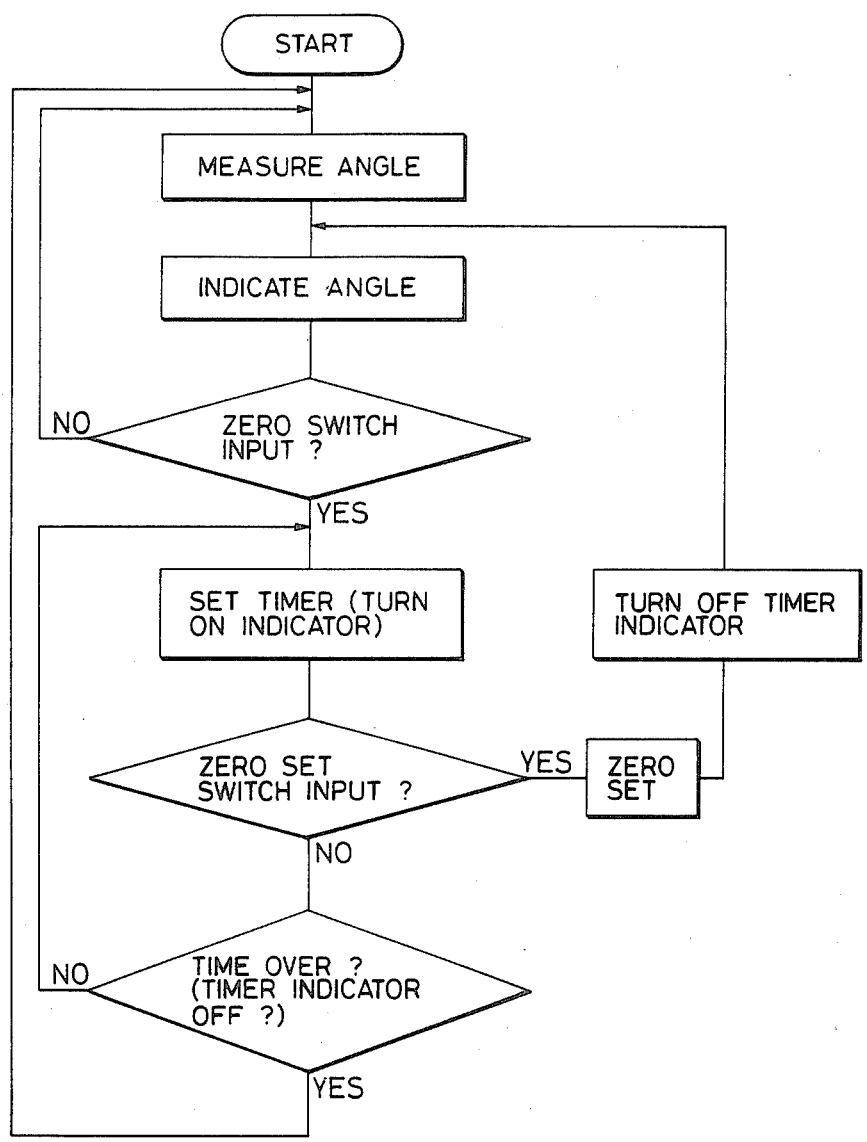
FIG. 2 is a flow chart for a description of the operation of the zero setting device.

FIG. 2 is a flow chart showing the operation of the zero setting device according to the invention. When the rotary stand 12 is turned to start an angle measurement, the angle is displayed on the angle displaying unit 17 with the aid of the pulse generating means 14, the rotation angle calculating means 15 and the displaying unit driving means 16. When, under this condition, the zero setting switch 18 is operated, the timer 20 is set, so that the timer operating indicating unit 24 operates for a predetermined period of time. In this case, the angle displaying unit 17 is not as yet zero-set. When, before the period of time set by the timer 20 elapses, i.e., while the timer 20 is in the "on" state, the zero setting switch 18 is again operated, this subsequent operation of the zero setting switch is detected by the second input discriminating means 21, so that the display of the angle displaying unit 17 is set to zero by the zero setting means 22 and the content of the counter in the rotation angle calculating means 15 is reset (set to zero). As a result, the operation of the timer operating indicating unit 24 is suspended, and the angle measurement can be made again by rotating the rotary stand 12.

On the other hand, in the case where, after the zero setting switch 18 has been operated once, the zero setting switch 18 is not operated again within the period of time set by the timer 20, the zero setting operation is not carried out. That is, in this case, it is determined that the first operation of the zero setting switch 18 has been made in error, and therefore the zero setting operation is not carried out and the angle measurement can be continued.

As is apparent from the above description, in the zero setting device in the surveying instrument according to the invention, the display of the angle displaying unit is not set to zero by only one operation of the zero setting switch. That is, the zero setting operation is effected only when, within the predetermined period of time after the first operation of the zero setting switch, the zero setting switch is again operated. The zero setting switch can be operated twice within a predetermined period of time only when it is clearly intended to be done and it is not considered likely that the zero setting switch is operated twice by chance. Therefore, the probability of the erroneous zero setting operation which is caused by operating the zero setting switch in error can be made very small. As the timer operation indicating unit indicates the possibility of the zero setting operation to the surveyor, a second erroneous operation of the zero setting switch by the surveyor can be substantially completely prevented. Since, even if the zero setting switch is provided at the position where it can be operated with ease no problem occurs and the operability of the surveying instrument is not affected thereby.

We claim:

1. A zero setting device in a surveying instrument comprising: a base stand; a rotary stand which is rotatable with respect to said base stand and has collimating means; means for electrically detecting an rotation angle of said rotary stand with respect to said base stand; an angle displaying unit for displaying an angle detected by said detecting means; and a zero setting device, said zero setting device comprising,
    a manually-operated zero setting switch,
    a timer which starts operating for a predetermined period when said zero setting switch is manually operated a first time; and
    zero setting means for setting a display angle on said angle displaying unit to zero only when said zero setting switch is manually operated a second time, said second time occurring during the operation of said timer.

2. A zero setting device as claimed in claim 1, further comprising a timer operation indicating unit for indicating to an operator that said timer is operating.

3. A zero setting device as claimed in claim 2, in which said timer operation indicating unit is a buzzer.

4. A zero setting device as claimed in claim 2, in which said timer operation indicating unit is a lamp.

5. A zero setting device as recited in claim 1, wherein said timer receives an output of said switch and said zero setting means includes a logic circuit receiving an output of said switch and an output of said timer.

6. A zero setting device as recited in claim 1, wherein said logic circuit is an AND circuit.

* * * * *